(12) United States Patent
Haraguchi (10) Patent No.: US 6,292,322 B1
(45) Date of Patent: Sep. 18, 2001

(54) POWER SUPPLY CONTROL FOR A SIGNAL PROCESSING APPARATUS (75) Inventor: Hiroko Haraguchi, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/169,445

(22) Filed: Oct. 9, 1998

(30) Foreign Application Priority Data

Apr. 28, 1998 (JP) .................................................. 10-118829

(51) Int. Cl.⁷ .................................................. G11B 19/02
(52) U.S. Cl. .............................. 360/69; 360/95; 360/60; 369/53.18
(58) Field of Search ................................. 360/69, 62, 75, 360/31, 60; 369/53.18

(56) References Cited

U.S. PATENT DOCUMENTS

| 4,816,934 | * | 3/1989 | Tsuyuguchi | 360/62 |
| 5,402,200 | * | 3/1995 | Shrinkle et al. | 360/69 |
| 5,412,519 | * | 5/1995 | Buettner et al. | 360/75 X |
| 5,412,809 | * | 5/1995 | Tam et al. | 360/75 X |
| 5,452,277 | * | 9/1995 | Bajorek et al. | 360/69 X |
| 5,774,292 | * | 6/1998 | Georgiou et al. | 360/73.03 |
| 5,953,174 | * | 9/1999 | Satou et al. | 360/69 |
| 6,151,182 | * | 11/2000 | Koizumi et al. | 360/69 |

FOREIGN PATENT DOCUMENTS 3122865   5/1991   (JP) .

* cited by examiner

Primary Examiner—Andrew L. Sniezek
(74) Attorney, Agent, or Firm—Greer, Burns & Crain, LTD (57) ABSTRACT A signal processing apparatus for reading and writing information to a storage medium includes a power supply control circuit that selectively inhibits and enables power to individual circuits of the signal processing apparatus in order to achieve maximum power conservation. The signal processing apparatus looks ahead to determine a next operation to be performed and, using either read or write information of the next operation, along with information concerning how long it takes to power up individual circuits, determines the optimal time to switch power on to the individual circuits. Power is then supplied to the individual circuits of the signal processing apparatus only when it is required by the individual circuits.

15 Claims, 10 Drawing Sheets

POWER SUPPLY CONTROL FOR A SIGNAL PROCESSING APPARATUS

BACKGROUND OF THE INVENTION

The present invention relates generally to an apparatus for processing a read signal and a write signal for a magnetic disk drive, and, more particularly, to a system of controlling the supply of power to individual circuits in a signal processing apparatus.

DESCRIPTION OF THE RELATED ART

A magnetic disk drive has a drive head for reading data recorded on a magnetic disk, and a signal processing apparatus which processes a data signal read from the magnetic disk and a data signal to be written thereon. The signal processing apparatus is preferably constructed of single integrated circuit device. The trend toward faster processing of data signals unfortunately includes increased power consumption.

Japanese Unexamined Patent Publication No. H3(1991)-122865 discloses a signal processing apparatus that has lower power consumption. In a period when no read and write commands are received (rough servo period), the supply of power to the signal processing apparatus is cut off. In a fine servo period, immediately before entering a read operation and write operation, power is supplied to the signal processing apparatus. This control reduces the power consumption. Because power supply is inhibited only in a period in which no read and write commands are received, there is still room for improvement.

Another proposed signal processing apparatus has a circuit that sets the power source on or off for each module in the apparatus. However, an analog module has large power consumption, and, once powered off, needs time to be powered on again. To prevent such time loss, power supply only to the analog module is permitted. Such power supply becomes an obstacle to lowering the overall power consumption.

Accordingly, it is an object of the present invention to provide a signal processing apparatus having reduced power consumption.

SUMMARY OF THE INVENTION

In one aspect of the invention, a method of supplying power to a signal processing apparatus includes the steps of: storing power up times of a plurality of individual circuits of the signal processing apparatus; determining power on times for the plurality of individual circuits in advance of said determined power on times for a predetermined operation; calculating power supply inhibit times for the plurality of circuits using the power up time of the individual circuits and the circuit power on time; and while performing the predetermined operation, inhibiting and enabling the supply of power to individual ones of the plurality of circuits based on the calculated inhibit times.

In another aspect of the invention, a signal processing apparatus includes a read signal processing section having a plurality of circuits for processing a read signal in a read operation; a write signal processing section having a plurality of circuits for processing write data to generate a write signal in a write operation; a servo signal processing section having a plurality of circuits for processing the read signal to acquire servo information from the read signal in a servo period; and a power supply control circuit having a plurality of gate circuits connected to individual circuits of at least one of the read signal processing section, the write signal processing section and the servo signal processing section.

In yet another aspect of the invention, a control apparatus is provided for controlling a signal processing apparatus. The signal processing apparatus includes a read signal processing section having a plurality of circuits for processing a read signal in a read operation, a write signal processing section having a plurality of circuits for processing data to be written to generate a write signal, and a servo signal processing section having a plurality of circuits for processing the read signal to acquire servo information from the read signal in a servo period. The control apparatus operates to acquire information about a next operation to be performed several cycles ahead of an operation currently being performed, based on read information or write information, to determine an inactive period for a circuit during the next operation using the acquired information, to determine a circuit whose inactive period exceeds a power-up time thereof, based on the determined inactive periods and predetermined power-up times of the individual circuits of at least one of the read signal processing section, the write signal processing section and the servo signal processing section, to determine a timing for inhibiting power supply to the individual circuits of the read signal processing section, the write signal processing section and the servo signal processing section based on the determined information, and to output signals for inhibiting power to the circuits having inactive periods that exceed their power-up time in accordance with the determined timing.

In one aspect of the invention, a disk drive includes a signal processing apparatus for executing a read operation, a write operation and a servo operation. The signal processing apparatus includes a read signal processing section having a plurality of circuits for processing a read signal in a read operation, a write signal processing section having a plurality of circuits for processing data to be written, to generate a write signal in a write operation, and a servo signal processing section having a plurality of circuits for processing the read signal and the write signal to acquire servo information, and a control apparatus for controlling power supply to the signal processing apparatus. The control apparatus operates to acquire information about a read operation or a write operation several cycles ahead of a cycle of an operation currently being performed using read information or write information, to determine an inactive period of the individual circuits during the next operation using the acquired information, to determine a circuit whose inactive period exceeds a power-up time thereof, based on predetermined inactive periods and predetermined power-up times of the individual circuits of at least one of the read signal processing section, the write signal processing section and the servo signal processing section, to determine a timing for inhibiting power supply to the individual circuits of the read signal processing section, the write signal processing section and the servo signal processing section based on the determined information, and to output signals for inhibiting power to the circuits having inactive periods that exceed their power-up time in accordance with the determined timing.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
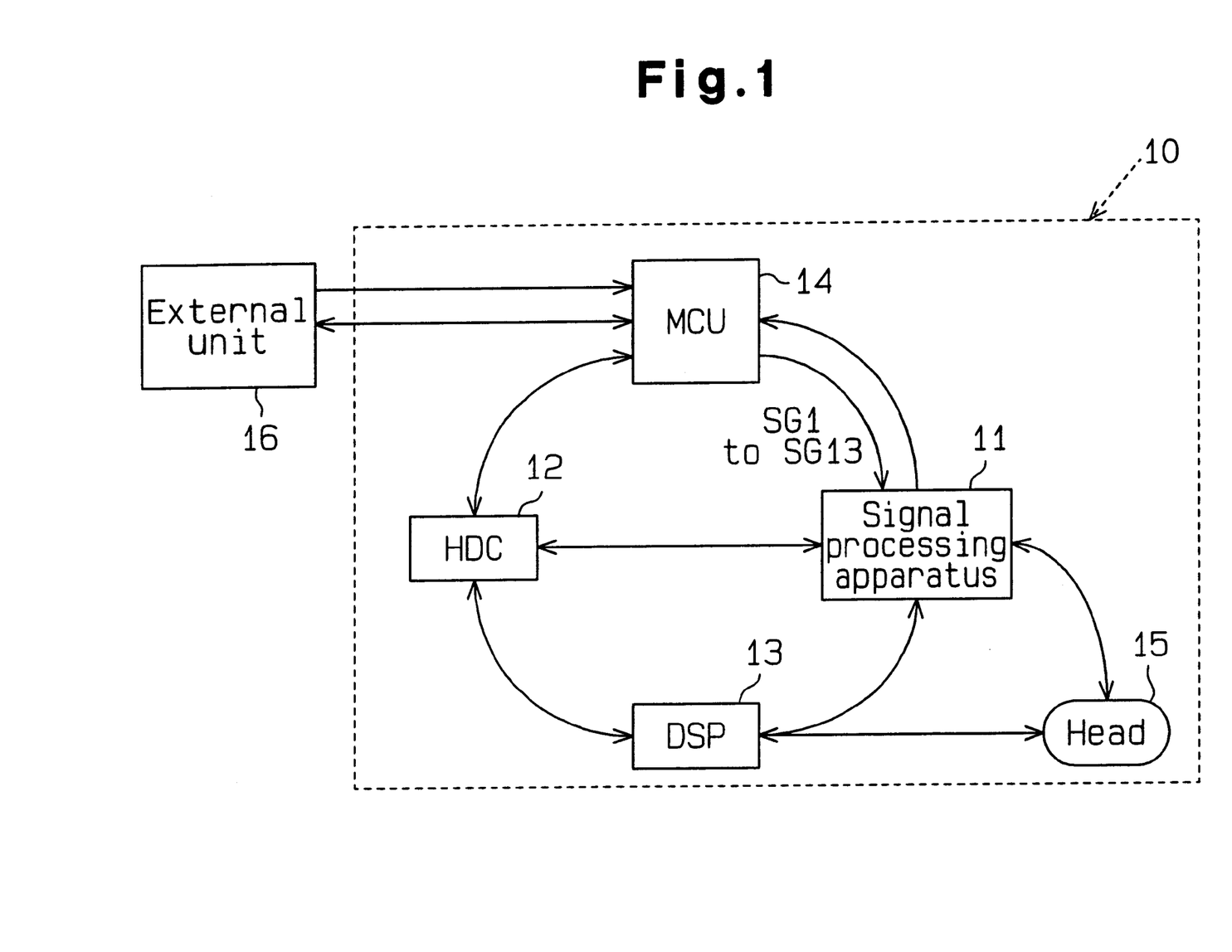
FIG. 1 is a schematic system block diagram of a magnetic disk drive.

FIG. 1 is a schematic system block diagram of a magnetic disk drive 10. The magnetic disk drive 10 comprises a signal processing apparatus 11, a hard disk controller (HDC) 12, a digital signal processor (DSP) 13, a micro controller unit (MCU) 14 and a drive head 15. In this embodiment, the signal processing apparatus 11, HDC 12, DSP 13 and MCU 14 comprise separate single-chip semiconductor integrated circuit devices.

The signal processing apparatus 11 processes a read signal, read from a magnetic disk (not shown) by means of the drive head 15, and supplies the processed read signal to an external unit 16 by way of the MCU 14. The signal processing apparatus 11 also processes a write data signal from the external unit 16 via the MCU 14 and writes the processed write data signal on the magnetic disk by means of the drive head 15. The signal processing apparatus 11 supplies servo information (position information) from the drive head 15, which has been read from the magnetic disk, to the HDC 12 and MCU 14.

Figure 2:
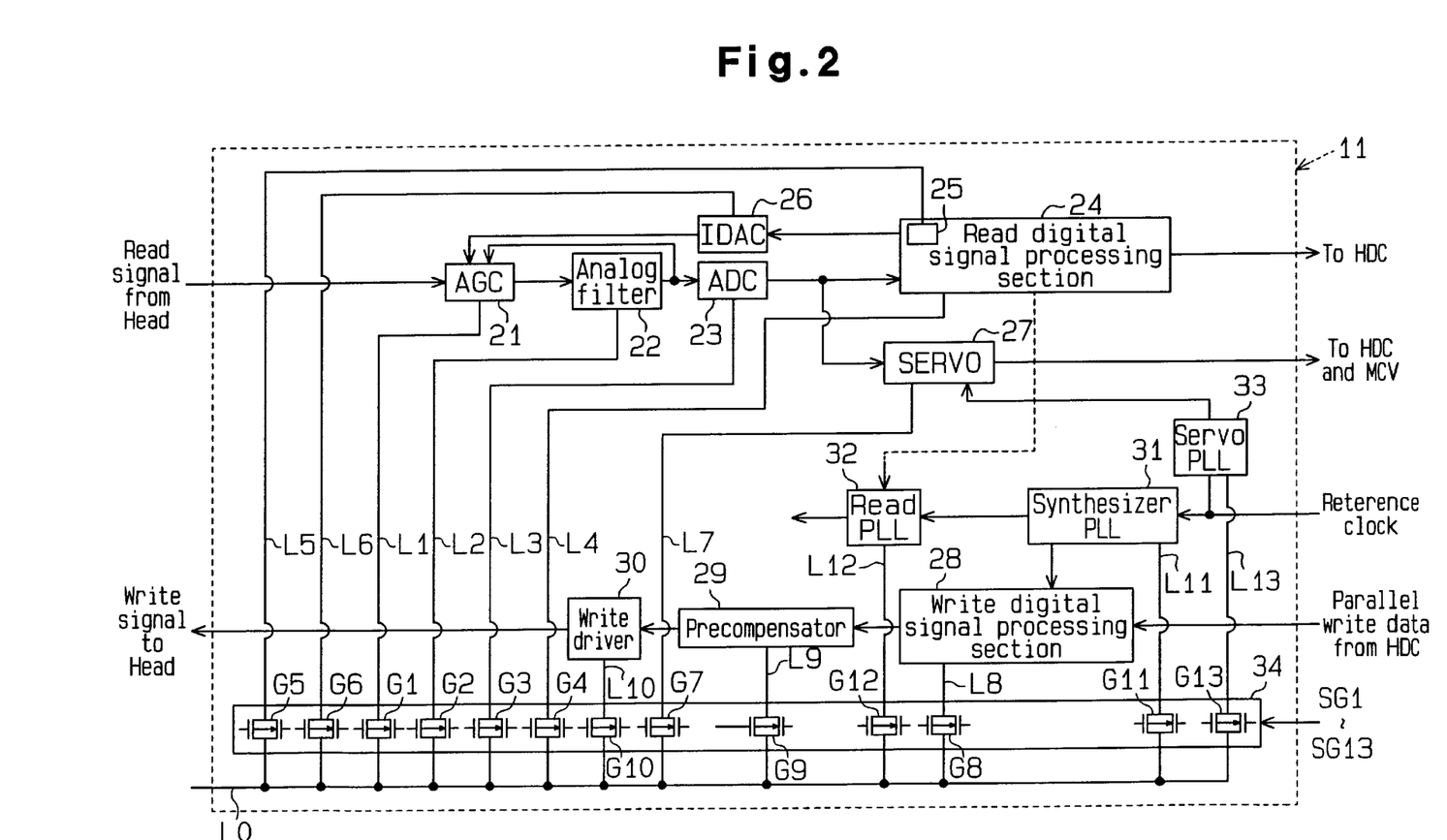
FIG. 2 is a schematic block diagram of a signal processing apparatus according to one embodiment of the present invention.

FIG. 2 shows schematic block diagram of the signal processing apparatus 11. An auto gain control amplifier (AGC) 21 amplifies the read signal received from the drive head 15, and supplies the amplified read signal to an analog filter 22. The analog filter 22 removes a predetermined frequency component from the amplified read signal and supplies the filtered read signal to an A/D converter (ADC) 23. The ADC 23 converts the filtered read signal to a digital read signal. The digital read signal is supplied to a composite operation circuit 25 of a read digital signal processing section 24. The composite operation circuit 25 binarizes the digital read signal and detects the level and phase of the digital read signal.

The read digital signal processing section 24 processes the binary read signal to generate a parallel read signal. The HDC 12 receives and extracts user data from the parallel read signal.

A D/A converter (IDAC) 26 converts the digital read signal from the composite operation circuit 25 to an analog signal and supplies this analog signal to the AGC 21. The AGC 21 controls its own amplification factor using the analog signal from the IDAC 24 and the filtered read signal from the analog filter 22.

A servo information extractor (SERVO) 27 also receives the digital read signal from the ADC 23 and uses it to detect servo information (position information) for the drive head 15. The servo information is detected when the read signal is a signal in the servo region.

The HDC 12 receives the servo information from the SERVO 27, and acquires the relative position between a write or read sector and the drive head 15 based on the servo information. The MCU 14 receives the servo information from the SERVO 27, and determines processing situations in a read operation, a write operation and a servo period or the like of the signal processing apparatus 11 based on the servo information.

The signal processing apparatus 11 also includes a write digital signal processing section 28 that receives parallel write data from the HDC 12. The parallel write data is to be written to the magnetic disk via the head 15. The write digital signal processing section 28 performs a scramble process on the parallel write data. In the scramble process, data rearranging is carried out in accordance with a predetermined system such that the individual bits do not have "0" or "1" in succession. The write digital signal processing section 28 encodes the scrambled data according to a predetermined method, and converts the encoded data to serial data. The serial data is supplied through a precompensator 29 and a write driver 30 to the drive head 15 as a write signal. The drive head 15 sequentially writes write data on the magnetic disk based on the write signal.

The signal processing apparatus 11 also includes a synthesizer PLL 31. The synthesizer PLL 31 receives a reference clock from an external unit (not shown), and generates a first reference clock having a predetermined frequency from the received reference clock. A read PLL 32 receives the reference clock from the synthesizer PLL 31 and the binary read signal from the digital signal processing section 24, and generates a sync signal which is used to read the read signal while adjusting its phase and frequency. The sync signal is supplied to the read digital signal processing section 24. The first reference clock from the synthesizer PLL 31 is supplied as a sync signal to the write digital signal processing section 28.

A servo PLL 33 receives the reference clock from the external unit (not shown) and generates a second reference clock of a predetermined frequency. The SERVO 27 detects servo information (positional information) from the digital read signal in synchronism with the second reference clock from the servo PLL 33.

A power supply control circuit 34 includes first to thirteenth gate circuits G1 to G13 which control the supply of drive power to the individual circuits 21–33 of the signal processing apparatus 11. Each of the gate circuits G1–G13 preferably comprises an N channel MOS transistor and a P channel MOS transistor. The gate circuits G1–G13 are turned on or off in response to respective power supply control signals SG1 to SG13 received from the MCU 14, respectively. This ON/OFF control controls the supply of drive power at a predetermined timing.

The first gate circuit G1 has a first terminal connected to an external power line L0, and a second terminal connected via a line L1 to the AGC 21. The ON/OFF operation of the first gate circuit G1 is controlled by the power supply control signal SG1. When the first gate circuit G1 is turned on, therefore, drive power is supplied to the AGC 21 from the external power line L0.

The second gate circuit G2 has a first terminal connected to the external power line L0, and a second terminal connected via a line L2 to the analog filter 22. The ON/OFF operation of the second gate circuit G2 is controlled by the power supply control signal SG2. When the second gate circuit G2 is turned on, drive power is supplied to the analog filter 22 from the external power line L0.

The third gate circuit G3 has a first terminal connected to the external power line L0, and a second terminal connected via a line L3 to the ADC 23. The ON/OFF operation of the third gate circuit G3 is controlled by the power supply control signal SG3. When the third gate circuit G3 is turned on, drive power is supplied to the ADC 23 from the external power line L0.

The fourth gate circuit G4 has a first terminal connected to the external power line L0, and a second terminal connected via a line L4 to the read digital signal processing section 24. The ON/OFF operation of the fourth gate circuit G4 is controlled by the power supply control signal SG4. When the fourth gate circuit G4 is turned on, drive power is supplied to the read digital signal processing section 24 from the external power line L0.

The fifth gate circuit G5 has a first terminal connected to the external power line L0, and a second terminal connected via a line L5 to the composite operation circuit 25. The ON/OFF operation of the fifth gate circuit G5 is controlled by the power supply control signal SG5. When the fifth gate circuit G5 is turned on, drive power is supplied to the composite operation circuit 25 from the external power line L0.

The sixth gate circuit G6 has a first terminal connected to the external power line L0, and a second terminal connected via a line L6 to the IDAC 26. The ON/OFF operation of the sixth gate circuit G6 is controlled by the power supply control signal SG6. When the sixth gate circuit G6 is turned on, drive power is supplied to the IDAC 26 from the external power line L0.

The seventh gate circuit G7 has a first terminal, connected to the external power line L0, and a second terminal connected via a line L7 to the SERVO 27. The ON/OFF operation of the seventh gate circuit G7 is controlled by the power supply control signal SG7. When the seventh gate circuit G7 is turned on, drive power is supplied to the SERVO 27 from the external power line L0.

The eighth gate circuit G8 has a first terminal connected to the external power line L0, and a second terminal connected via a line L8 to the write digital signal processing section 28. The ON/OFF operation of the eighth gate circuit G8 is controlled by the power supply control signal SG8. When the eighth gate circuit G8 is turned on, drive power is supplied to the write digital signal processing section 28 from the external power line L0.

The ninth gate circuit G9 has a first terminal connected to the external power line L0, and a second terminal connected via a line L9 to the precompensator 29, The ON/OFF operation of the ninth gate circuit G9 is controlled by the power supply control signal SG9. When the ninth gate circuit G9 is turned on, drive power is supplied to the precompensator 29 from the external power line L0.

The tenth gate circuit G10 has a first terminal connected to the external power line L0, and a second terminal connected via a line L10 to the write driver 30. The ON/OFF operation of the tenth gate circuit G10 is controlled by the power supply control signal SG10. When the tenth gate circuit G10 is turned on, drive power is supplied to the write driver 30 from the external power line L0.

The eleventh gate circuit G11 has a first terminal connected to the external power line L0, and a second terminal connected via a line L11 to the synthesizer PLL 31. The ON/OFF operation of the eleventh gate circuit G11 is controlled by the power supply control signal SG11. When the eleventh gate circuit G11 is turned on, drive power is supplied to the synthesizer PLL 31 from the external power line L0.

The twelfth gate circuit G12 has a first terminal connected to the external power line L0, and a second terminal connected via a line L12 to the read PLL 32. The ON/OFF operation of the twelfth gate circuit G12 is controlled by the power supply control signal SG12. When the twelfth gate circuit G12 is turned on, drive power is supplied to the read PLL 32 from the external power line L0.

The thirteenth gate circuit G13 has a first terminal connected to the external power line L0, and a second terminal connected via a line L13 to the servo PLL 33. The ON/OFF operation of the thirteenth gate circuit G13 is controlled by the power supply control signal SG13. When the thirteenth gate circuit G13 is turned on, drive power is supplied to the servo PLL 33 from the external power line L0. The external power line L0 is connected to a power supply unit (not shown) for the magnetic disk drive 10.

Returning to FIG. 1, the HDC 12 provides the signal processing apparatus 11 with a signal for controlling the read operation and write operation of the signal processing apparatus 11. The HDC 12 acquires user data from the parallel read signal from the read digital signal processing section 24 of the signal processing apparatus 11, and supplies the obtained user data to the external unit 16 via the MCU 14. The HDC 12 also receives write data from the external unit 16 via the MCU 14, and sends the write data to the write digital signal processing section 28 of the signal processing apparatus 11.

The DSP 13 computes the position of the drive head 15 based on the servo information (positional information) from the SERVO 27 of the signal processing apparatus 11, and generates a servo control signal to move the drive head 15 based on that position and the read or write sector position from the HDC 12. The DSP 13 sends the servo control signal to a moving control unit (not shown) and a head control unit (not shown). The moving control unit moves the drive head 15 to a predetermined position in accordance with the servo control signal. The head control unit controls the read and write operations of the drive head 15 according to the servo control signal.

The MCU 14 exchanges various kinds of data with the external unit 16 and performs the general control of the unit 10. The MCU 14 receives read information from the external unit 16, and computes the length and sector position of data to be read, based on the read information. Based on the data length and the sector position, the MCU 14 controls the signal processing apparatus 11, the HDC 12 and the DSP 13 to read data recorded on the magnetic disk.

The MCU 14 receives write information from the external unit 16, and computes the length and sector position of data to be written, based on the write information. Based on the data length and the sector position, the MCU 14 controls the signal processing apparatus 11, the HDC 12 and the DSP 13 to write the write data from the external unit in a predetermined sector of the magnetic disk.

Figure 3:
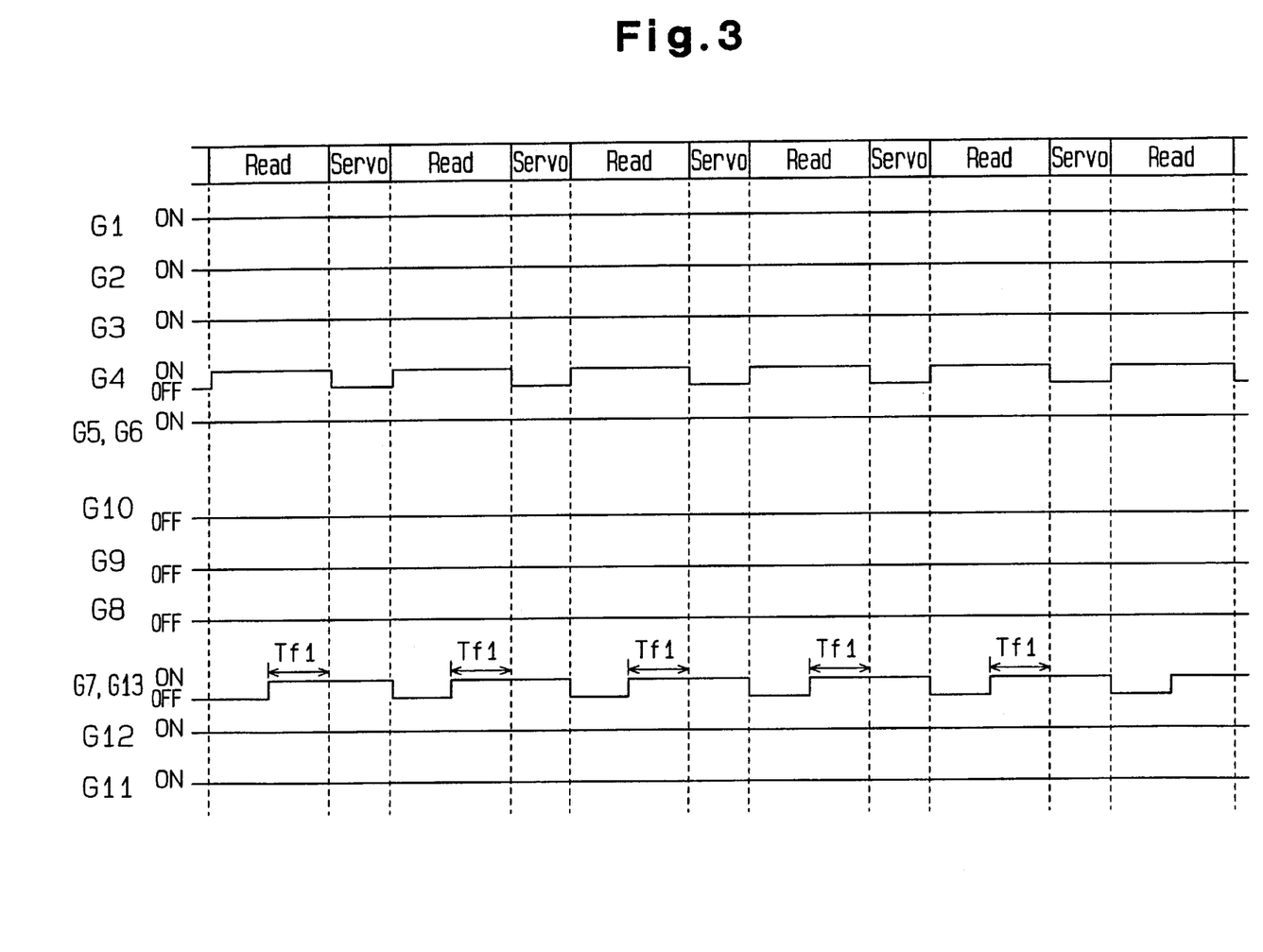
FIG. 3 is an output waveform diagram of power-supply control signals supplied to the individual circuits of the signal processing apparatus of FIG. 2 when a read operation is performed continuously.
Figure 4:
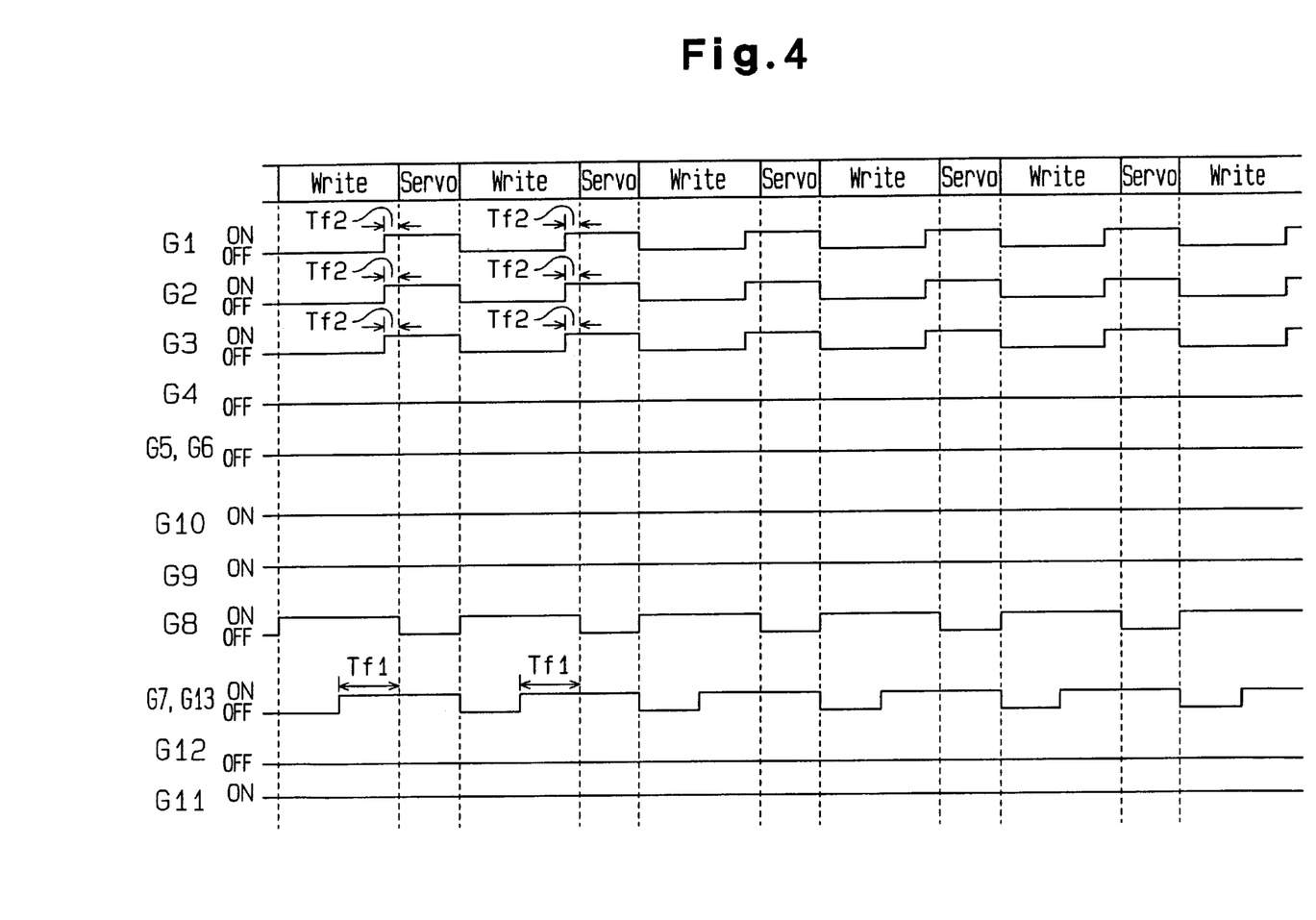
FIG. 4 is an output waveform diagram of power supply control signals supplied to the individual circuits of the signal processing apparatus of FIG. 2 when a write operation is performed continuously.
Figure 5:
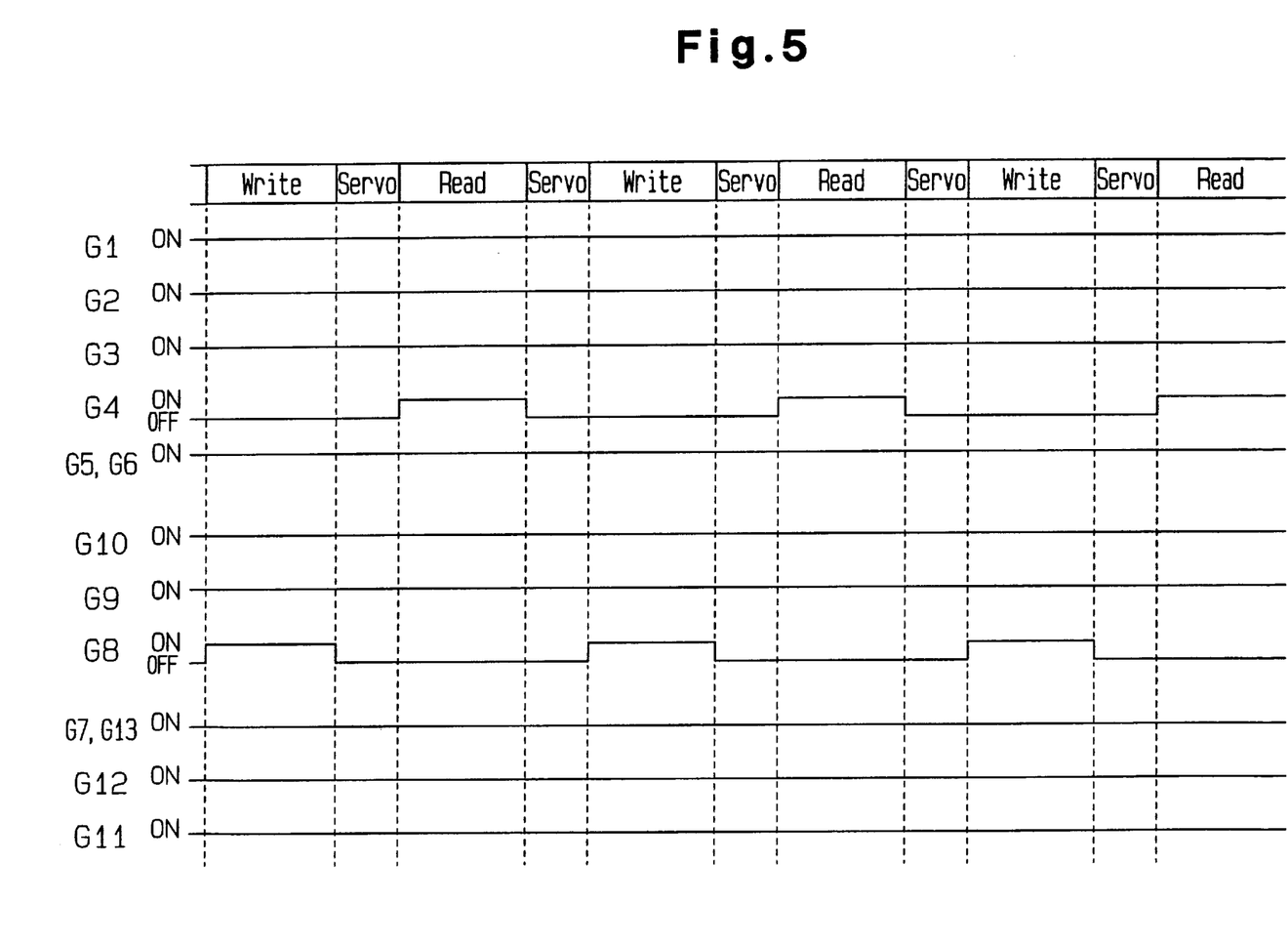
FIG. 5 is a first output waveform diagram of power supply control signals supplied to the individual circuits of the signal processing apparatus of FIG. 2 when read and write operations are alternately repeated sector by sector.
Figure 6:
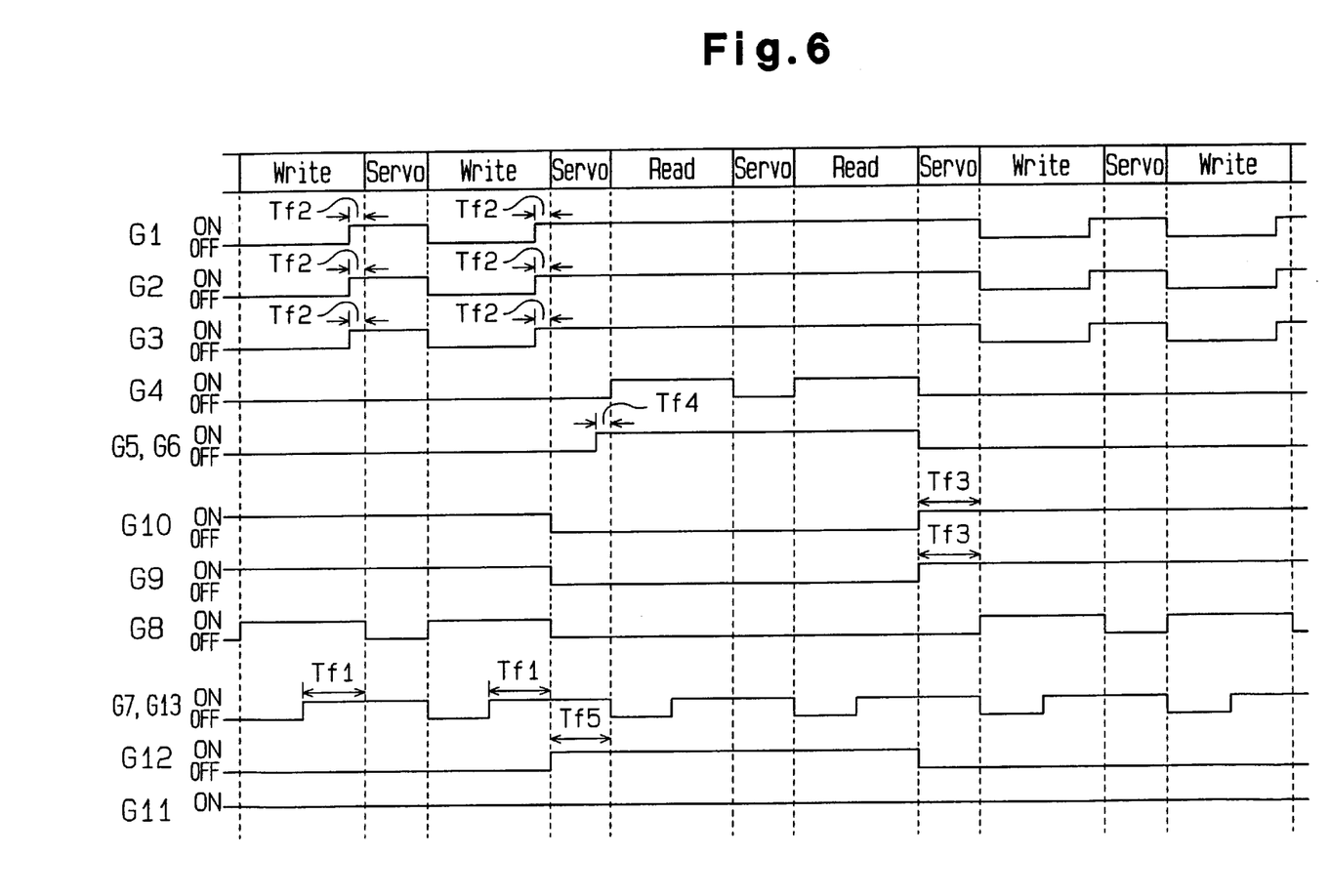
FIG. 6 is a first output waveform diagram of power supply control signals supplied to the individual circuits of the signal processing apparatus of FIG. 2 when read and write operations are alternately repeated every two sectors.

At the time of controlling the signal processing apparatus 11 based on the read information and write information, the MCU 14 generates the power supply control signals SG1–SG13 that control the supply of drive power to the individual circuits 21–33 of the signal processing apparatus 11, as illustrated in FIGS. 3 to 6. FIG. 3 is an output waveform diagram of the power supply control signals SG1–SG13 in a case where the read operation is repeated continuously in the order of read, servo, read, servo and so forth. FIG. 4 is an output waveform diagram of the power supply control signals SG1–SG13 in a case where the write operation is repeated continuously in the order of write, servo, write, servo and so forth. FIG. 5 is an output waveform diagram of the power supply control signals SG1–SG13 in a case where the read and write operations are alternately repeated (sector by sector), in the order of read, servo, write, servo, and so forth. FIG. 6 is an output waveform diagram of the power supply control signals SG1–SG13 in a case where the read and write operations are alternately repeated every two operations (every two sectors), in the order of write, servo, write, servo, read, servo, read, and so forth.

The MCU 14 receives read information and write information for a sequential operation from the external unit 16, and performs computations for several cycles ahead from the current read or write operation of the drive head 15 and the current processing of the signal processing apparatus 11. That is, the MCU 14 reads ahead read information and write information and performs computation based on the information. The read-ahead computation is possible because the time required for reading data from a predetermined sector and the time required for writing data in a predetermined sector, both to be done by the drive head 15, are far longer than the times required for processing such read and write information. Thus, the MCU 14 determines the control procedures of the individual circuits 21–33 several cycles in advance.

The MCU 14 prestores data on the times (power-up times) needed for the individual circuits 21–33 to become stable after power-on. The MCU 14 then determines when an inactive circuit must be powered on so that the circuit is ready for use at the required time. The MCU 14 also computes the optimal timing for cutting off power supply to the circuit 21–33.

The MCU 14 then generates the power supply control signals SG1–SG13 at the calculated times. This allows power supply to the write system to be shut off in read mode, and power supply to the read system to be shut off in write mode. This power supply control reduces the power consumption of the signal processing apparatus 11. Since power supply control is executed in light of the prestored power-up times, accurate signal processing is performed within minimal power consumption.

[Read Operation]

The MCU 14 determines a read operation will be performed continuously, and generates the power supply control signals SG1–SG13 as shown in FIG. 3.

During the read operation, the MCU 14 generates the power supply control signals SG8–SG10 for disabling the eighth to tenth gate circuits G8–G10 to cut off the drive power to the individual circuits 28–30 of the write system. Further, the MCU 14 generates the power supply control signals SG1–SG7 for enabling the first to seventh gate circuits G1–G7 to supply the drive power to the individual circuits 21–27 of the read system. The signal processing apparatus 11 carries out only the read operation and does not perform a write operation. While power should be supplied to the individual circuits 21–27 of the read system and the PLLs 31–33, no power needs to be supplied to the individual circuits 28–30 of the write system.

During the servo period, the MCU 14 generates the power supply control signal SG4 for disabling the fourth gate circuit G4 to block power supply to the individual circuits in the read digital signal processing section 24, excluding the composite operation circuit 25. This is because during the servo period, user data is not read out, and the individual circuits in the read digital signal processing section 24, excluding the composite operation circuit 25 do not need to be operating. The inactive periods of the individual circuits 21–27 are longer than the power-up times of the individual circuits 21–27. Since the individual circuits 21–27 in the read digital signal processing section 24, excluding the composite operation circuit 25 are digital modules, their power-up times are very short. Thus, power is supplied to the read digital signal processing section 24 nearly the instant the read operation starts.

The timing in which the power supply control signal SG4 is supplied to the fourth gate circuit G4 (i.e., the timing when the read operation for the current sector ends and when servo for the read operation for the next sector starts) is previously determined through computation based on the data length and sector position of the associated sector. The MCU 14 also obtains the time of the end of the servo period from the servo information. The MCU 14 determines the start and end of the servo period from the read information and servo information, and supplies the power supply control signal SG4 having a predetermined level to the fourth gate circuit G4 during the servo period.

During the servo period, it is necessary to keep the AGC 21, analog filter 22, ADC 23, composite operation circuit 25, IDAC 26, synthesizer PLL 31 and read PLL 32 active in order to read the servo information. In the read operation, therefore, the MCU 14 generates the power supply control signals SG1–SG3, SG5, SG6, SG11 and SG12 to enable the first to third, fifth, sixth, eleventh and twelfth gate circuits G1–G3, G5, G6, G11 and G12, and supplies power to the AGC 21, analog filter 22, ADC 23, composite operation circuit 25, IDAC 26, synthesizer PLL 31 and read PLL 32.

As no servo information is read during the read operation, the SERVO 27 and the servo PLL 33 are substantially inactive, The inactive periods of the SERVO 27 and the servo PLL 33 are longer than the power-up times, and power to the SERVO 27 and Servo PLL 33 are cut off. However, the SERVO 27 does not have an instantaneous start up time, so power is supplied before the servo period starts. In other words, power must be given to the SERVO 27 to power up the SERVO 27 before the servo period starts. The predetermined time is obtained by subtracting a time Tf1 (first flying time) necessary to power up the SERVO 27 and the servo PLL 33 from the period of the read operation.

The MCU 14 generates the power supply control signals SG7 and SG13 to disable the seventh and thirteenth gate circuits G7 and G13 in a period from the beginning of the read operation to the passing of a predetermined time. The timing at which the MCU 14 supplies the power supply control signals SG7 and SG13 to the respective seventh and thirteenth gate circuits G7 and G13 is determined on the basis of the servo information from the signal processing apparatus 11.

When the sector read operation starts after the end of the servo period, the MCU 14 generates the power supply control signals SG7 and SG13 to disable the seventh and thirteenth gate circuits G7 and G13. Then, the MCU 14 computes the start time of the servo period (the period of the read operation) for the next sector and the first flying time Tf1 before the start time of the servo period. Based on the first flying time Tf1, the MCU 14 generates the power supply control signals SG7 and SG13 to enable the seventh and thirteenth gate circuits G7 and G13 when a predetermined time elapses after the beginning of the read operation.

When the read operation is to be executed continuously, therefore, the present invention has the following advantages.

(1) During the read operation, power supply to the individual circuits 28–30 of the write system is inhibited. This reduces the power consumption of the individual circuits 28–30 of the write system.
(2) During the servo period, power supply to the individual circuits in the read digital signal processing section 24, excluding the composite operation circuit 25 is cut off. This reduces the power consumption of the individual circuits of the read digital signal processing section 24.
(3) During a period from the beginning of the read operation to a point at which a predetermined time passes before the servo period starts, power supply to the SERVO 27 and the servo PLL 33 is cut off. This reduces the power consumption of the SERVO 27 and the servo PLL 33.
(4) The above power control decreases power consumption without interfering with the read operation. [Write Operation]

The MCU 14 determines when the write operation will be performed continuously, and generates the power supply control signals SG1–SG13 as shown in FIG. 4.

During the write operation, the MCU 14 generates the power supply control signals SG4–SG6 and SG12 for disabling the fourth to sixth and twelfth gate circuits G4–G6 and G12 to cut off the drive power to the read digital signal processing section 24 (including the composite operation circuit 25 in this embodiment), the IDAC 26 and the read PLL 32. In this embodiment, inhibition of power supply to the IDAC 26 renders the composite operation circuit 25 inactive, so that power supply to the composite operation circuit 25 is cut off too. As the IDAC 26 becomes inactive, the amplification factor of the AGC 21 is controlled by the output signal of the analog filter 22. The signal processing apparatus 11 carries out only the write operation and does not perform the read 25 operation. Therefore, setting the read digital signal processing section 24 substantially inactive during the write operation does not cause any problems.

Servo information is always needed to guide the drive head 15 to a predetermined sector and write user data in that sector in the write operation. The servo information in the write operation is acquired from read data that is read in the servo period. In the servo period, therefore, power is supplied to the AGC 21, analog filter 22, ADC 23, synthesizer PLL 31 and servo PLL 33. However, the AGC 21, analog filter 22 and ADC 23 are analog modules, which have relatively long power-up times. It is thus not possible to start supplying power to the AGC 21, analog filter 22 and ADC 23 the instant the servo period starts, so power is supplied to the AGC 21, analog filter 22 and ADC 23 a predetermined time elapses before the servo period starts. The predetermined time is obtained by subtracting a time Tf2 (second flying time) necessary for the individual circuits 21–32 to be powered up from the period of the write operation.

The MCU 14 generates the power supply control signals SG1–SG3 to disable the first to third gate circuits G1–G3 in a period from the beginning of the write operation to the passing of a predetermined time in order to shut off power supply to the AGC 21, analog filter 22 and ADC 23. The timing at which the MCU 14 supplies the power supply control signals SG1–SG3 respectively to the AGC 21, analog filter 22 and ADC 23 is determined based on the servo information from the signal processing apparatus 11.

When the write operation for a target sector starts based on the servo information, the MCU 14 generates the power supply control signals SG1–SG3 to inhibit power supply to the AGC 21, analog filter 22 and ADC 23. The MCU 14 then computes the end time of the current sector writing operation (the start time for the servo period for the write operation for the next sector) and the second flying time Tf2. Based on the second flying time Tf2, the MCU 14 generates the power supply control signals SG1–SG3 to permit power supply to the AGC 21, analog filter 22 and ADC 23 when a predetermined time elapses since the beginning of the write operation.

Servo information is always essential to guide the drive head 15 to a predetermined sector and write user data in that sector in the write operation. Before the servo period starts, therefore, power is so supplied to enable the SERVO 27 and the servo PLL 33 in the servo period when a predetermined time elapses after the write operation has started.

To generate a timing signal for a write operation, the synthesizer PLL 31 is preferably operated even in the write operation. For this reason, the MCU 14 generates the power supply control signal SG11 for enabling the eleventh gate circuit G11 during the write operation to supply power to the synthesizer PLL 31.

In the write operation, the individual circuits 28–30 of the write system must be set operational. During the write operation, the MCU 14 generates the power supply control signals SG8–SG10 to enable the eighth to tenth gate circuits G8–G10, and supplies drive power to the write digital signal processing section 28, precompensator 29 and write driver 30.

In the write operation, no write data is written during the servo period where the target sector changes from the current one to the next one. During the servo period, therefore, the write digital signal processing section 28, precompensator 29 and write driver 30 are substantially inactive. But, the power-up times of the precompensator 29 and write driver 30 are longer than the servo period. The MCU 14 thus generates the power supply control signals SG9 and SG10 to always enable the ninth and tenth gate circuits G9 and G10 even during the servo period, maintaining the supply of power to the precompensator 29 and the write driver 30. The power-up time of the write digital signal processing section 28 is shorter than the servo period. In the servo period, therefore, the MCU 14 generates the power supply control signal SG8 for disabling the eighth gate circuit G8 to cut off power supply to the write digital signal processing section 28. In the write operation, the MCU 14 also generates the power supply control signal SG8 for enabling the eighth gate circuit G8. The timing at which the MCU 14 supplies the power supply control signal SG8 to the eighth gate circuit G8 is determined based on the data length of the sector being read and the servo information.

When the write operation is to be performed continuously, the present invention has the following advantages.
(1) In the write operation and the servo period, power supply to the individual circuits in the read digital signal processing section 24 including the composite operation circuit 25, the read PLL 32 and the IDAC 26 is cut off. As a result, the power consumed by the read digital signal processing section 24 including the composite operation circuit 25, the read PLL 32 and the IDAC 26 is reduced.
(2) During a period from the beginning of the write operation to a point at which a predetermined time passes before the next servo period starts, power supply to the SERVO 27 and the servo PLL 33 is cut off. This results in a reduction in the power consumption of the SERVO 27 and the servo PLL 33.
(3) During a period from the beginning of the write operation to a point at which a predetermined time passes before the next servo period starts, power supply to the AGC 21, the analog filter 22 and the ADC 23 is cut off. This reduces the power consumed by the AGC 21, the analog filter 22 and the ADC 23.
(4) In the servo period, power supply to the write digital signal processing section 28 is inhibited, resulting in reduced power consumption of the write digital signal processing section 28.
(5) The above power control decreases power consumption without interfering with the write operation.

[Case where read and write operations are repeated alternately sector by sector]

The MCU 14 determines that read and write operations will be repeated alternately sector by sector, and generates the power supply control signals SG1–SG13, as shown in FIG. 5.

As read and write operations are repeated alternately, power is always supplied to the individual circuits 21–23, 25–27 and 29–33, excluding the read digital signal processing section 24 and the write digital signal processing section 28.

Power supply to the SERVO 27 and the servo PLL 33 may be inhibited in a read operation, and power supply to the AGC 21, analog filter 22, ADC 23, SERVO 27 and servo PLL 33 may be cut off in a write operation. In this case, it is preferable to set the timing for supplying power to the individual circuits with careful consideration of the power-up times of the individual circuits.

The MCU 14 generates the power supply control signals SG1–SG3, SG5–SG7 and SG9–SG13 for enabling the first to third, fifth to seventh and ninth to thirteenth gate circuits G1–G3, G5–G7 and G9–G13 to always supply power to the circuits 21–23, 25–27 and 29–33.

In the read operation and servo period, the MCU 14 generates the power supply control signal SG8 for disabling the eighth gate circuit G8 to inhibit the supply of drive power to the write digital signal processing section 28.

In the write operation and servo period, the MCU 14 generates the power supply control signal SG4 for disabling the fourth gate circuit G4 to inhibit the supply of drive power to the read digital signal processing section 24, excluding the composite operation circuit 25.

When read and write operations are repeated alternately sector by sector, therefore, the present invention has the following advantages.
(1) In the read operation and the servo period, power supply to the write digital signal processing section 28 is cut off. As a result, the power consumption of the write digital signal processing section 28 is reduced.
(2) In the write operation and the servo period, power supply to the read digital signal processing section 24, excluding the composite operation circuit 25, is cut off. As a result, the power consumption of the read digital signal processing section 24, excluding the composite operation circuit 25, is reduced.
(3) The above power control decreases power consumption without interfering with the read and write operations.

[Case where read and write operations are repeated alternately every two sectors]

The MCU 14 determines that read and write operations will be repeated alternately every two sectors, and generates the power supply control signals SG1–SG13, as shown in FIG. 6.

During the read operation and servo period, the MCU 14 generates the power supply control signal SG8 for disabling the eighth gate circuit G8 to inhibit power supply to the write digital signal processing section 28. In the write operation and servo period, the MCU 14 generates the power supply control signal SG4 for disabling the fourth gate circuit G4 to inhibit power supply to the read digital signal processing section 24.

In the write operation for two sectors and the servo period for the write operation (the period from the end of the read operation for the second sector to the beginning of the read operation of the next sector to be read), power supply to the composite operation circuit 25 and the IDAC 26 is cut off. This inhibition of power supply is possible because that period is longer than the power-up times of the composite operation circuit 25 and the IDAC 26.

As the composite operation circuit 25 and the IDAC 26 are analog modules whose power-up times are relatively long, however, power supply cannot be initiated at about the same time as the read operation for the next sector. It is thus necessary to supply power before the read operation for the next sector. That is, during a period from the end of the read operation for the second sector to a point at which a predetermined time passes before the read operation for the next sector, power supply to the composite operation circuit 25 and the IDAC 26 is inhibited. The predetermined time is acquired by subtracting a power-up time, Tf4 (the fourth flying time), of the composite operation circuit 25 and the IDAC 26, from the period from the end of the read operation for the second sector to the beginning of the read operation for the next sector to be read. While the predetermined time passes since the end of the read operation for the second sector, the MCU 14 generates the power supply control signals SG5 and SG6 for disabling the fifth and sixth gate circuits G5 and G6 to inhibit power supply to the composite operation circuit 25 and the IDAC 26.

In the read operation for two sectors and the servo period for the read operation (the period from the end of the write operation for the second sector to the beginning of the write operation of the next sector to be written), power supply to the precompensator 29 and the write driver 30 is cut off. This inhibition of power supply is possible because the power-up times of the precompensator 29 and the write driver 30 are longer than that period.

As the precompensator 29 and the write driver 30 are analog modules which have long power-up times, however, power supply cannot be initiated at the same time as the next write operation. It is therefore necessary to supply power before the next write operation starts. The shut off time is acquired by subtracting the power-up time, Tf3 (the third flying time), of the precompensator 29 and the write driver 30, from the period from the end of the write operation for the second sector to the beginning of the next write operation. While the predetermined time passes since the end of the write operation for the second sector, the MCU 14 generates the power supply control signals SG9 and SG10 for disabling the ninth and tenth gate circuits G9 and G10 to inhibit power supply to the precompensator 29 and the write driver 30.

Because the write operation continues over two sectors, power supply to the AGC 21, the analog filter 22 and the ADC 23 is cut off from the beginning of the write operation, as in the example shown in FIG. 4. That is, before the servo period starts from the beginning of the write operation, the MCU 14 generates the power supply control signals SG1–SG3 for disabling the first to third gate circuits G1–G3 to inhibit power supply to the AGC 21, the analog filter 22 and the ADC 23.

In the write operation for two sectors and the servo period for the write operation, power supply to the read PLL 32 is cut off. This is possible because the power-up time of the read PLL 32 is considerably shorter than that period.

As the read PLL 32 is an analog module, power cannot be supplied at the same time as the read operation for the new, first sector starts. This requires that power should be supplied before the next read operation starts. That is, during a period from the end of the read operation for the second sector to a point at which a predetermined time passes before the next read operation starts, power supply to the read PLL 32 is inhibited. The predetermined time is acquired by subtracting the power-up time, Tf5 (the fifth flying time), of the read PLL 32, from the period from the end of the read operation for the second sector to the beginning of the next read operation. While the predetermined time passes since the end of the read operation for the second sector, the MCU 14 generates the power supply control signal SG12 for disabling the twelfth gate circuit G12 to inhibit power supply to the read PLL 32.

When read and write operations are repeated alternately every two sectors, therefore, the present invention has the following advantages.

(1) In the read operation and the servo period, power supply to the write digital signal processing section 28 is cut off. As a result, the power consumption of the write digital signal processing section 28 is reduced.

(2) In the write operation, power supply to the read digital signal processing section 24 is cut off. As a result, the power consumption of the read digital signal processing section 24, excluding the composite operation circuit 25, is reduced.

(3) While a predetermined time passes since the beginning of the write operation, power supply to the AGC 21, the analog filter 22 and the ADC 23 is cut off. This results in a reduction in the power consumed by the AGC 21, the analog filter 22 and the ADC 23.

(4) While a predetermined time passes since the end of the write operation for the second sector, power supply to the precompensator 29 and the write driver 30 is cut off. Consequently, the power consumption of the precompensator 29 and the write driver 30 is reduced.

(5) While a predetermined time passes since the end of the read operation for the second sector, power supply to the read PLL 32 is cut off. As a result, the power consumption of the read PLL 32 is reduced.

(6) The above power control decreases power consumption without interfering with the read and write operations.

It should be apparent to those skilled in the art that the present invention may be embodied in many other specific forms without departing from the spirit or scope of the invention. Particularly, it should be understood that the present invention may be embodied in the following forms.

Figure 7:
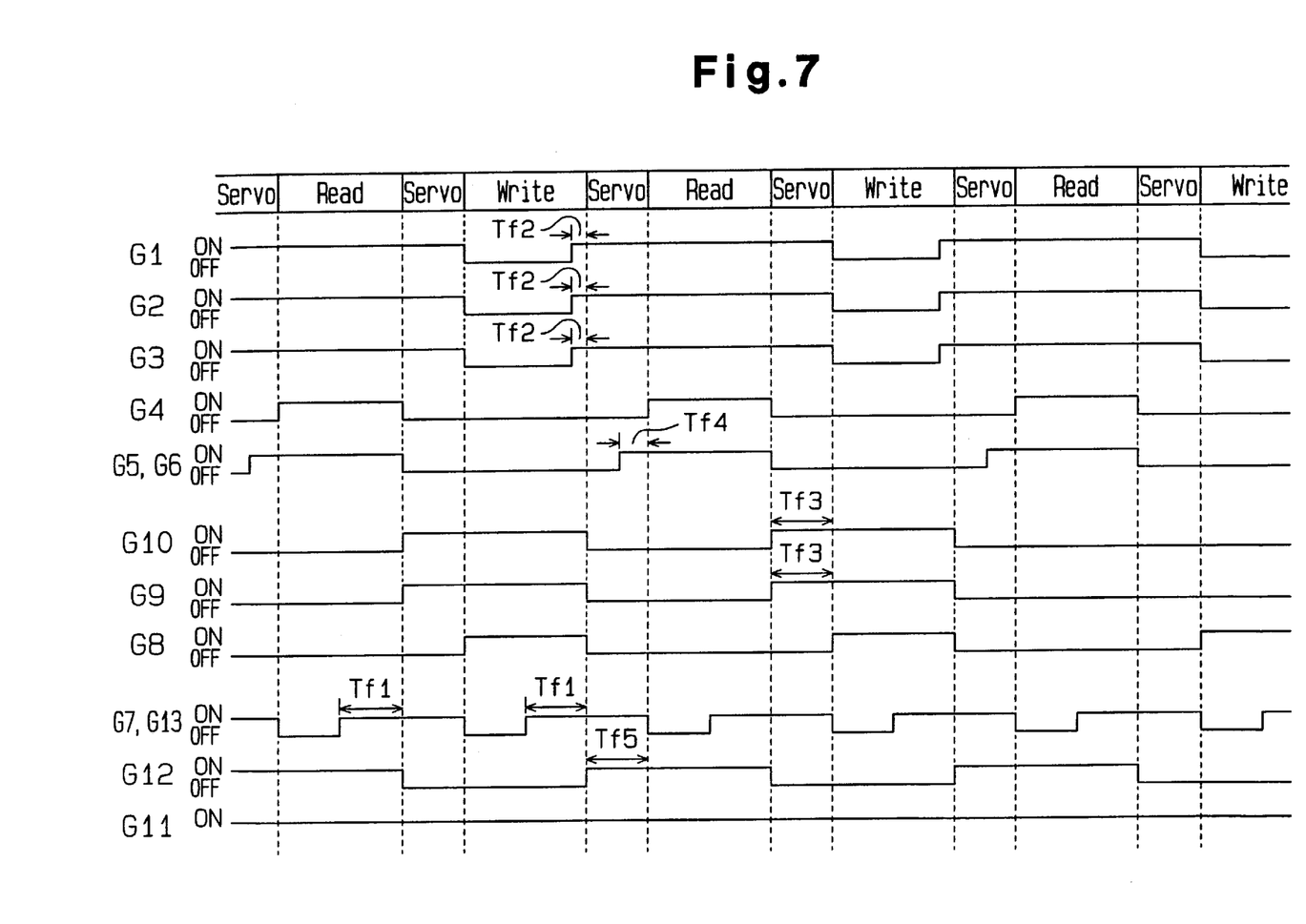
FIG. 7 is a second output waveform diagram of power supply control signals supplied to the individual circuits of the signal processing apparatus of FIG. 2 when read and write operations are alternately repeated sector by sector.
Figure 8:
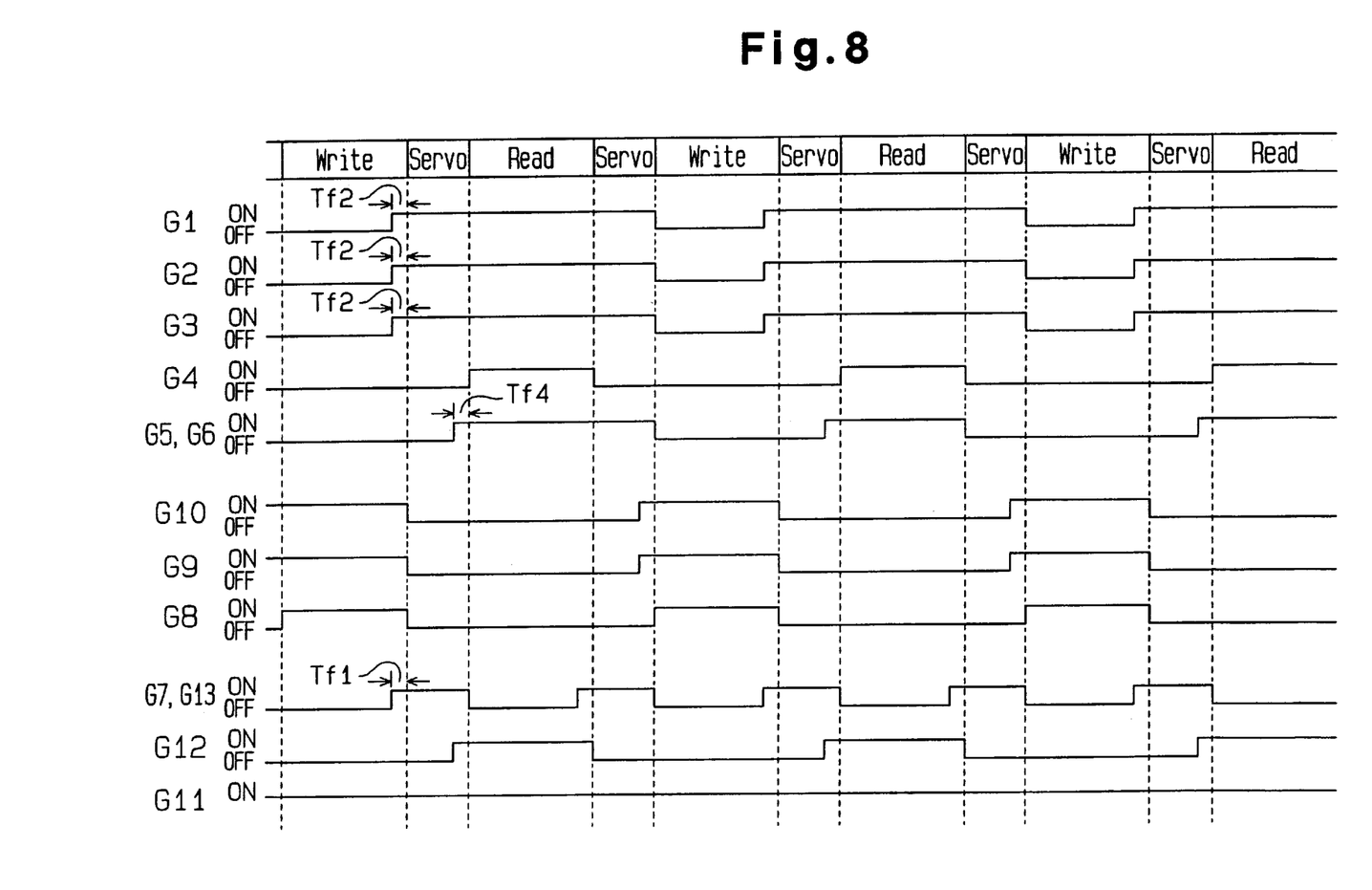
FIG. 8 is a third output waveform diagram of power supply control signals supplied to the individual circuits of the signal processing apparatus of FIG. 2 when read and write operations are alternately repeated sector by sector.

When read and write operations are repeated alternately sector by sector, power supply to the AGC 21, analog filter 22, ADC 23, SERVO 27 and servo PLL 33 may be cut off in the write operation, and power supply to the SERVO 27 and servo PLL 33 may be cut off in the read operation, as shown in FIGS. 7 and 8. This scheme further reduces the power consumption. It is preferable that the power supply control illustrated in FIGS. 7 and 8 is adapted to a chip of a signal processing apparatus 11 which can perform fast processing. In this case, the power-up times of the individual circuits 21–33 of the signal processing apparatus 11 are decreased. When the power-up times are shorter than the read operation period, the write operation period and the servo period, the output timing for the power supply control signals SG1–SG13 may be determined based on a read command and a write command output from the MCU 14, instead of servo information.

Figure 9:
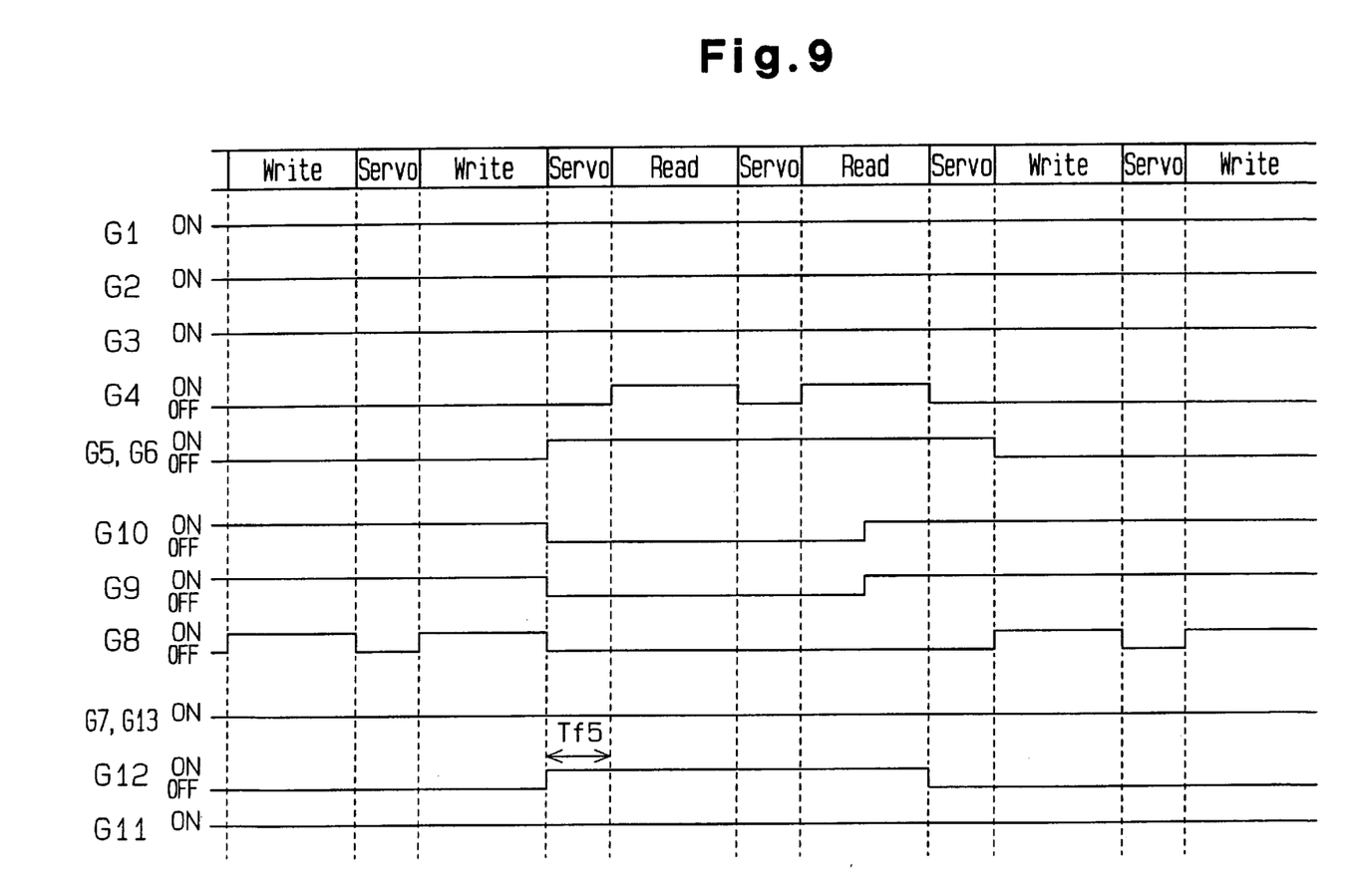
FIG. 9 is a second output waveform diagram of power supply control signals supplied to the individual circuits of the signal processing apparatus of FIG. 2 when read and write operations are alternately repeated every two sectors.

When read and write operations are repeated alternately every two sectors, power may always be supplied to the AGC 21, analog filter 22, ADC 23, SERVO 27 and servo PLL 33, as shown in FIG. 9.

Figure 10:
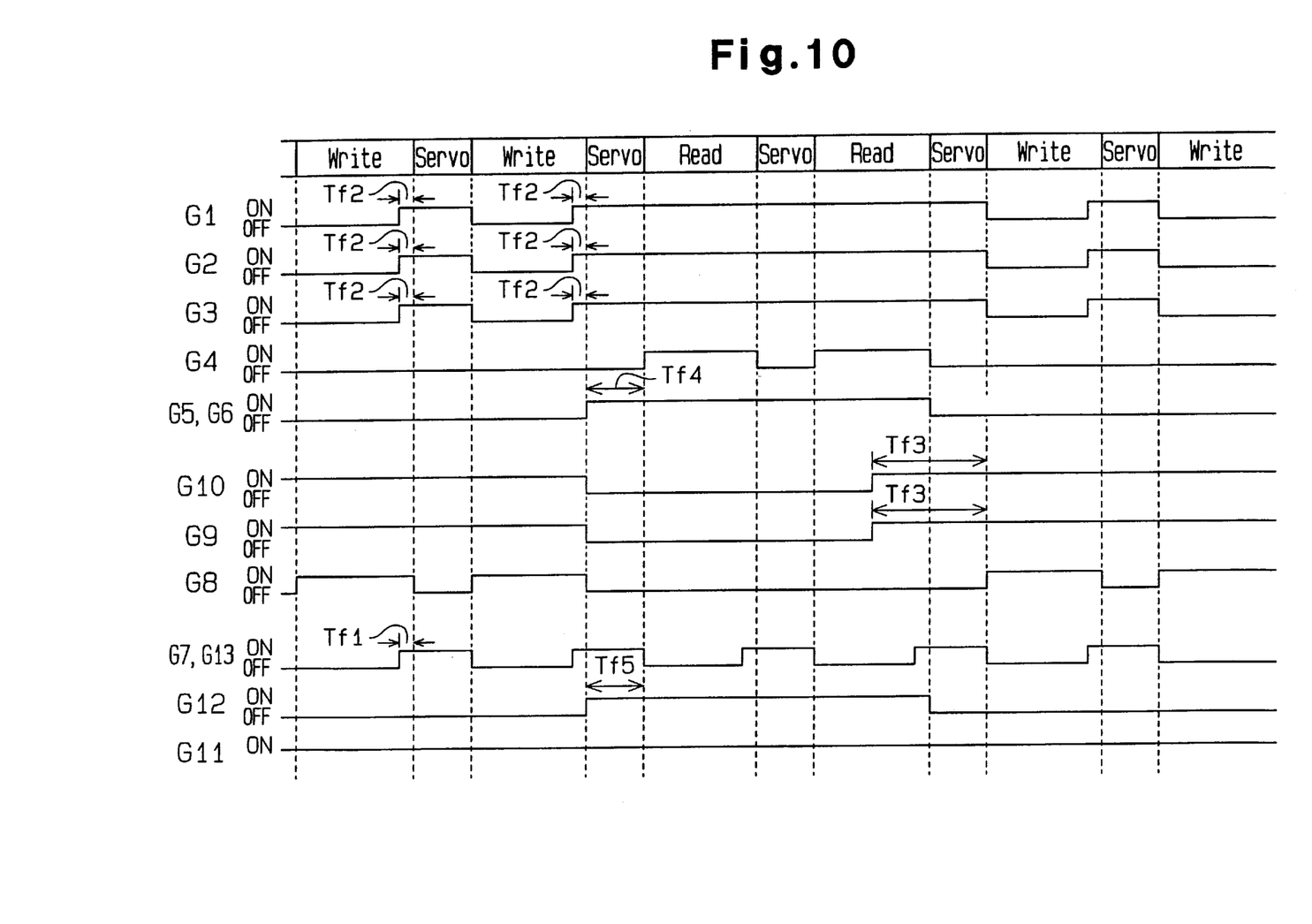
FIG. 10 is a third output waveform diagram of power supply control signals supplied to the individual circuits of the signal processing apparatus of FIG. 2 when read and write operations are alternately repeated every two sectors.

The individual flying times Tf1–Tf5 may be changed as needed. As shown in FIG. 10, for example, the fourth flying time Tf4 may be set to coincide with the servo period. The third flying time Tf3 may be made longer as shown in FIG. 10. The first and second flying times Tf1 and Tf2 may be set to different times, module by module.

The present invention may be embodied in a signal processing apparatus for another type of disk drive, like an optical disk drive.

The power supply control circuit 34 may be provided in an external unit. In this case, the power supply control circuit 34 is connected to the individual circuits of the signal processing apparatus via the lines L1–L13 and the external terminal of the external unit.

Further, it will be understood by those of ordinary skill in the art that additional power using circuits may be controlled to even further reduce power, or certain circuits may be always supplied with power (and thus not connected to the power supply control circuit 34) as necessary.

Therefore, the present examples and embodiment are to be considered as illustrative and not restrictive and the invention is not to be limited to the details given herein, but may be modified within the scope and equivalence of the appended claims.

What is claimed is:

1. A method of supplying power to a signal processing apparatus, comprising the steps of:

storing power up times of a plurality of individual circuits of the signal processing apparatus;

determining power on times for the plurality of individual circuits in advance of said determined power on times for a predetermined operation;

calculating power supply inhibit times for the plurality of circuits using the power up time of the individual circuits and the circuit power on time; and while performing the predetermined operation, inhibiting and enabling the supply of power to individual ones of the plurality of circuits based on the calculated inhibit times.

2. The method according to claim 1, wherein the signal processing apparatus includes a read signal processing section having a plurality of circuits, a write signal processing section having a plurality of circuits, and a servo signal processing section having a plurality of circuits, and the predetermined operation comprises at least one of a read operation, a write operation and a servo control operation.

3. The method according to claim 1, wherein the plurality of circuits of the read signal processing section includes an auto gain control amplifier, an analog filter, an A/D converter, a read digital signal processing circuit and a D/A converter; and the power supply inhibiting and enabling step includes inhibiting power supply to a circuit in the read signal processing section whose inactive period exceeds the power-up time thereof in at least one of the write operation and the servo period.

4. The method according to claim 1, wherein the plurality of circuits of the write signal processing section includes a write driver, a precompensator and a write digital signal processing circuit; and the power supply inhibiting and enabling step includes inhibiting power supply to a circuit in the write signal processing section whose inactive period exceeds the power-up time thereof in at least one of the read operation and the servo period.

5. The method according to claim 1, wherein the plurality of circuits of the servo signal processing section includes a servo information extractor and a servo PLL; and the power supply inhibiting and enabling step includes inhibiting power supply to a circuit in the servo signal processing section whose inactive period exceeds the power-up time thereof in at least one of the read operation and the write operation.

6. The method according to claim 1, further comprising the steps of:

acquiring, from servo information, information about a read operation or a write operation several cycles ahead of a current operation being performed by the signal processing apparatus;

specifying a circuit whose operation is to be stopped in the read operation or the write operation based on the acquired information;

determining if an inactive period of the specified circuit whose operation is to be stopped exceeds the power-up time thereof; and determining a timing for inhibiting power supply to the circuit whose operation is to be stopped for exceeding the power-up time thereof, based on the acquired information.

7. The method according to claim 6, wherein the acquired information includes information about the number of times an operation is performed in succession.

8. The method according to claim 1, further comprising the step of providing a power supply control circuit having a plurality of gate circuits used to control power supply to individual circuits.

9. The method according to claim 1, wherein the signal processing apparatus comprises a single semiconductor integrated circuit device.

10. A signal processing apparatus comprising:

a read signal processing section having a plurality of circuits for processing a read signal in a read operation;

a write signal processing section having a plurality of circuits for processing write data to generate a write signal in a write operation;

a servo signal processing section having a plurality of circuits for processing the read signal to acquire servo information from the read signal in a servo period;

a power supply control circuit having a plurality of gate circuits connected to individual circuits of at least one of the read signal processing section, the write signal processing section and the servo signal processing section;

a memory for storing power up times for the individual circuits of the read signal processing section, the write signal processing section and the servo signal processing section; and an arithmetic unit for calculating a power off time for the individual circuits of the read signal processing section, the write signal processing section and the servo signal processing section using the stored power up times and a time when the individual circuits are required to be powered on to perform a predetermined operation.

11. The signal processing apparatus according to claim 10, wherein the signal processing apparatus comprises a single semiconductor integrated circuit device.

12. A control apparatus for controlling a signal processing apparatus including a read signal processing section having a plurality of circuits for processing a read signal in a read operation, a write signal processing section having a plurality of circuits for processing data to be written to generate a write signal, and a servo signal processing section having a plurality of circuits for processing the read signal to acquire servo information from the read signal in a servo period, the control apparatus operating to:

acquire information about a next operation to be performed several cycles ahead of an operation currently being performed, based on read information or write information;

determine an inactive period for a circuit during the next operation using the acquired information;

determine a circuit whose inactive period exceeds a power-up time thereof, based on the determined inactive periods and predetermined power-up times of the individual circuits of at least one of the read signal processing section, the write signal processing section and the servo signal processing section;

determine a timing for inhibiting power supply to the individual circuits of the read signal processing section, the write signal processing section and the servo signal processing section based on the determined information; and output signals for inhibiting power to the circuits having inactive periods that exceed their power-up time in accordance with the determined timing.

13. The control apparatus according to claim 12, wherein the control apparatus comprises a single semiconductor integrated circuit device.

14. A disk drive comprising:

a signal processing apparatus for executing a read operation, a write operation and a servo operation, the signal processing apparatus including, a read signal processing section having a plurality of circuits for processing a read signal in a read operation, a write signal processing section having a plurality of circuits for processing data to be written, to generate a write signal in a write operation, and a servo signal processing section having a plurality of circuits for processing the read signal and the write signal to acquire servo information; and a control apparatus for controlling power supply to the signal processing apparatus, the control apparatus operating to:

acquire information about a read operation or a write operation several cycles ahead of a cycle of an operation currently being performed using read information or write information;

determine an inactive period of the individual circuits during the next operation using the acquired information;

determine a circuit whose inactive period exceeds a power-up time thereof, based on predetermined inactive periods and predetermined power-up times of the individual circuits of at least one of the read signal processing section, the write signal processing section and the servo signal processing section;

determine a timing for inhibiting power supply to the individual circuits of the read signal processing section, the write signal processing section and the servo signal processing section based on the determined information; and output signals for inhibiting power to the circuits having inactive periods that exceed their power-up time in accordance with the determined timing.

15. The disk drive according to claim 14, wherein each of the signal processing apparatus and the control apparatus comprise a single semiconductor integrated circuit device.

* * * * *